(12) United States Patent
Goryachev et al.

(10) Patent No.: US 8,397,217 B2
(45) Date of Patent: Mar. 12, 2013

(54) INTEGRATING TEMPLATES INTO TESTS

(75) Inventors: Alex Goryachev, Haifa (IL); Ronny Morad, Kiriat Ata (IL); Wisam Kadry, Tira (IL); Sergey Shusterman, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 12/709,530

(22) Filed: Feb. 22, 2010

(65) Prior Publication Data
US 2011/0209004 A1    Aug. 25, 2011

(51) Int. Cl.
G06F 9/44    (2006.01)
G06F 11/00    (2006.01)

(52) U.S. Cl. ......................... 717/124; 717/106; 714/38.1

(58) Field of Classification Search .......... 717/106–109, 717/124–135; 714/37, 38.1
See application file for complete search history.

(56) References Cited

U.S. PATENT DOCUMENTS

| | | | |
|---|---|---|---|
| 4,550,406 A | 10/1985 | Neal | |
| 5,202,889 A | 4/1993 | Aharon et al. | |
| 5,646,949 A | 7/1997 | Bruce, Jr. et al. | |
| 5,754,755 A * | 5/1998 | Smith, Jr. | 714/38.1 |
| 5,774,358 A | 6/1998 | Shrote | |
| 5,995,915 A | 11/1999 | Reed et al. | |
| 6,006,028 A | 12/1999 | Aharon et al. | |
| 6,023,583 A * | 2/2000 | Honda | 717/158 |
| 6,178,533 B1 | 1/2001 | Chang | |
| 6,606,721 B1 | 8/2003 | Gowin, Jr. et al. | |
| 7,234,093 B2 | 6/2007 | Kadkade | |
| 7,278,056 B2 | 10/2007 | Hekmatpour | |
| 7,299,382 B2 * | 11/2007 | Jorapur | 714/38.14 |
| 7,707,553 B2 * | 4/2010 | Roques et al. | 717/124 |
| 7,913,230 B2 * | 3/2011 | Vikutan | 717/124 |
| 8,117,499 B2 * | 2/2012 | Copty et al. | 714/37 |
| 2001/0016879 A1 * | 8/2001 | Sekiguchi et al. | 709/319 |
| 2002/0002698 A1 | 1/2002 | Hekmatpour | |
| 2002/0040470 A1 * | 4/2002 | Guthrie et al. | 717/126 |
| 2003/0046673 A1 * | 3/2003 | Copeland et al. | 717/163 |
| 2003/0204784 A1 * | 10/2003 | Jorapur | 714/38 |
| 2003/0208743 A1 * | 11/2003 | Chong et al. | 717/106 |
| 2003/0229885 A1 * | 12/2003 | Gownder et al. | 717/115 |
| 2004/0139427 A1 * | 7/2004 | Garvey et al. | 717/141 |
| 2004/0205725 A1 * | 10/2004 | Lambert | 717/124 |
| 2006/0184908 A1 * | 8/2006 | Minami et al. | 716/10 |
| 2006/0225061 A1 * | 10/2006 | Ludwig et al. | 717/161 |
| 2007/0168973 A1 * | 7/2007 | Crihfield | 717/124 |
| 2007/0240127 A1 * | 10/2007 | Roques et al. | 717/124 |
| 2008/0109812 A1 * | 5/2008 | Vertes et al. | 718/104 |
| 2008/0114965 A1 | 5/2008 | Atoji et al. | |
| 2008/0184206 A1 * | 7/2008 | Vikutan | 717/127 |

(Continued)

OTHER PUBLICATIONS

MacColl et al., "Extending the Test Template Framework," 1998, 3rd Northern Formal Methods Workshop.*

(Continued)

*Primary Examiner* — Wei Zhen
*Assistant Examiner* — Qing Chen
(74) *Attorney, Agent, or Firm* — Ziv Glazberg; Glazberg & Applbaum Co.

(57) ABSTRACT

Test template may comprise a source code template instruction associated with source code commands. The source code template instruction is utilized in generation of a test. The generation of instructions associated with the source code template instruction takes into account utilization of shared resources by both the source code commands and by generated instructions that are generated by other template instructions.

21 Claims, 3 Drawing Sheets

U.S. PATENT DOCUMENTS

| | | | | |
|---|---|---|---|---|
| 2010/0318850 A1* | 12/2010 | Copty et al. | | 714/33 |
| 2011/0004865 A1* | 1/2011 | Brown et al. | | 717/113 |
| 2011/0106482 A1* | 5/2011 | Adir et al. | | 702/119 |
| 2011/0131031 A1* | 6/2011 | Katz et al. | | 703/28 |

OTHER PUBLICATIONS

MacColl et al., "Extending the Test Template Framework for specification-based testing of interactive systems," Jan. 18-21, 1999, Springer-Verlag.*

Stocks et al., "Test Templates: A Specification-based Testing Framework," 1993, IEEE, p. 405-414.*

Stocks et al., "Test Template Framework: A specification-based testing case study," 1993, ACM, p. 11-18.*

Geist Daniel, "A Method for Hunting Bugs that Occur Due to System Conflicts", HLDVT '08, 2008 IEEE International High Level Design Validation and Test Workshop, p. 11-17.

Emek et al,. "X-Gen: a random test-case generator for systems and SoCs", Seventh IEEE International High-Level Design Validation and Test Workshop, 2002, pp. 145-150, Oct. 2002.

* cited by examiner

FIG. 3

INTEGRATING TEMPLATES INTO TESTS

BACKGROUND

The present disclosure relates to verification of computerized systems, in general, and to generating tests based on test templates in particular.

Computerized devices control almost every aspect of our life—from writing documents to controlling traffic lights. However, computerized devices are bug-prone, and thus require a testing phase in which the bugs should be discovered. The testing phase, also referred to as verification phase, is considered one of the most difficult tasks in designing a computerized device. The cost of a bug may be enormous, as its consequences may be disastrous. For example, a bug may cause the injury of a person relying on the designated functionality of the computerized device. Additionally, a bug in hardware or firmware may be expensive to fix, as patching it requires call-back of the computerized device. Hence, many developers of computerized devices invest a significant portion, such as 70%, of the development cycle to discover erroneous functionalities of the computerized device.

A test template, comprising several template instructions, may be designed in order to test an aspect of a target computerized system. The test template may be utilized by a generator that generates several tests that are in line with the test template. The test may be, for example, a binary file or an assembler program that is configured to perform actions defined in the test template. In some cases, the test may be a text file comprising instructions to components of the target computerized system, such as processors, a simulator of the environment of the target computerized system, cache and the like.

BRIEF SUMMARY OF THE INVENTION

One exemplary embodiment of the disclosed subject matter is an apparatus having a processor, the apparatus comprising: a receiver configured to receive a test template, the test template comprises a plurality of template instructions, the plurality of template instruction comprises a source code template instruction, the source code template instruction comprises a source code command; a test generator configured to generate a test in accordance with the test template received by the receiver, the test generator comprising: a resource manager configured to manage resources utilized by the test; an instruction generator configured to generate a first instruction based on a template instruction of the plurality of template instructions; a code generator configured to generate a second instruction based on the source code template instruction, the second instruction is associated with the source code command, the code generator is configured to utilize the resource manager.

Another exemplary embodiment of the disclosed subject matter is a method for generating a test based on a test template, the method comprising: receiving the test template, the test template comprises a plurality of template instructions, the plurality of template instruction comprises a source code template instruction, the source code template instruction comprises a source code command; generating the test based on the test template, the generating the test comprises: generating a first instruction based on a first template instruction of the plurality of template instructions; generating a second instruction based on the source code template instruction; and wherein the generating the first instruction and generating a second instruction comprising: managing shared resources utilized by the first instruction and by the second instruction; whereby the test template is transformed to a test.

Yet another exemplary embodiment of the disclosed subject matter is a computer program product for generating a test based on a test template comprising: a computer readable medium; a first program instruction for receiving the test template, the test template comprises a plurality of template instructions, the plurality of template instruction comprises a source code template instruction, the source code template instruction comprises a source code command; a second program instruction for generating the test based on the test template, the second program instruction comprises: a third program instruction for generating a first instruction based on a first template instruction of the plurality of template instructions; a fourth program instruction for generating a second instruction based on the source code template instruction; and wherein the third and fourth program instructions comprising a fifth program instruction for managing shared resources utilized by the first instruction and by the second instruction; and wherein the first, second, third, fourth and fifth program instructions are stored on the computer readable medium.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to generate a test based on a test template. Another technical problem dealt with by the disclosed subject matter is utilization of the same resources in various test operations. For example, when a test comprises both random test template commands and a sequence of commands inputted by a user or a specific program, the sequence of commands should use different resources than the test template commands or otherwise avoid collision of use of shared resources. Sharing resources may cause changing a value in a register or memory location that is done by a random test command, while the same resource is used in the middle of a sequential process performed during the test, or vice versa. A sequence of commands may be used during a predefined and known operation, such as a known algorithm, known protocol and the like, that should be tested on a new module.

One technical solution comprises a computerized apparatus comprising a test generator comprising a resource manager configured to manage resources utilized by a test. The apparatus may also comprise an instruction generator configured to generate a first instruction based on a template instruction of the plurality of template instructions and a code generator configured to generate a second instruction based on the source code template instruction, the second instruction is associated with one or more source code commands comprised by the source code template instruction. The code generator is configured to utilize said resource manager.

One technical effect of utilizing the disclosed subject matter is automatically managing utilization of shared resources allocated to both the sequence and to the random commands. Another technical effect is managing the shared resources in a relatively seamless manner. Yet another technical effect is enabling a verification engineer to define a test template that may test aspects of the target computerized system in a relatively easy manner, such as for example without requiring the verification engineer to handle a correct combination of portions of the generated test.

Figure 1:
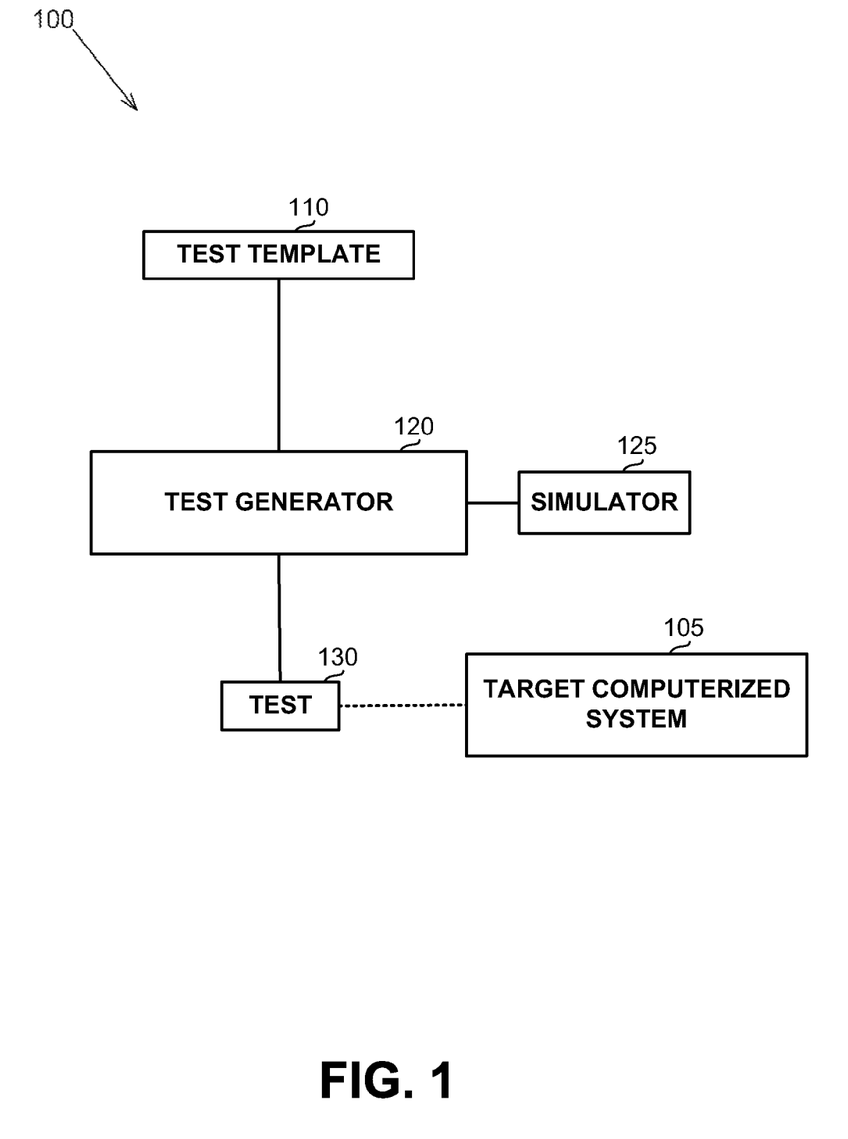
FIG. 1 shows a computerized verification environment in which the disclosed subject matter is used, in accordance with some exemplary embodiments of the subject matter.

Referring now to FIG. 1 showing a computerized verification environment in which the disclosed subject matter is used, in accordance with some exemplary embodiments of the subject matter. A computerized verification environment 100 may comprise a test template 110 and a test generator 120.

The test template 110 may be a set of definitions that are configured to determine a test associated with a target computerized system 105. The test template 110 may comprise a set of template instructions. A template instruction (not shown) may define a set of one or more possible instructions, such as different types of instructions, accessing different resources, for example different memory addresses, having different parameters and the like.

A template instruction may be for example "random instruction", which may define any valid instruction. A template instruction may be "ADD R3 R1+R2" which may define an addition instruction that adds values of registers. A template instruction may be "LOAD R4 MEM[R3+displacement]" which may define a loading of memory to R4 register from a memory location defined by some random displacement from the value of register R3. It will be noted that some of the instructions defined by a template instruction may differ in number of bits, such as for example a LOAD operation may be defined to load 8 bits or alternatively 16 bits. A template instruction may be "conditional branch" which may define any conditional branching instruction. The template instruction may or may not be provided with a target address or label. The template instruction may require a translation of effective address to a real address in generation.

Based on a template instruction one or more instructions may be generated. The template instruction may be a configured to provide for an interaction between components of the target computerized system 105. An instruction generated based on the template instruction may be configured to initiate an operation by a component of the target computerized system 105. As an example, the target computerized system 105 may comprise components such as a processor, a cache module, a memory controller, an I/O interface or the like. An instruction may be addressed to a specific component to trigger a functionality of the component. For example, the instruction may trigger an input to be received by the I/O interface (using, for example, a Bus Functional Model (BFM)). The instruction may alternatively trigger a functionality of a memory controller.

The one or more instructions, that are generated based on the template instruction, may be configured to provide for an predetermined interaction between component of the target computerized system 105.

In some exemplary embodiments, a template instruction may be a source code template instruction. The source code template instruction may define a set of one or more source code commands that are to be generated in the test 130. The source code template instruction may be associated with generation parameters that may be utilized in generation of the source code commands. The source code template instruction may be associated with simulation parameters that may be utilized during execution of the generated test to pass to the generated source code parameters that may be determined by other portions of the test. The source code commands may be source code commands in high level programming language, such as JAVA, C, C++, Fortran or the like. The source code commands may be commands in machine language, such as Assembly language, binary, or the like. In some exemplary embodiments, the source code commands may be comprised of a combination of such languages or may further include other functional languages describing a desired functionality.

In some exemplary embodiments, the target computerized system 105 may be a Processor, a Central Processing Unit (CPU), a microprocessor, an electronic circuit, an Integrated Circuit (IC), a mobile phone, a cellular device, a Personal Digital Assistant (PDA), hardware, a hardware system comprising a plurality of components, a chip, a System On Chip (SoC), or the like.

In some exemplary embodiments, the test generator 120 may generate a test 130 based on the test template 110. The test generator 120 may generate a test 130 that is configured to inspect some aspects of the target computerized system 105, such as for example invoking page fault functionality, initiating specialized functionalities in a cache, triggering optimization logic in an instruction scheduling or the like. It will be noted that the some aspects of the target computerized system 105 may be exceptional or deemed interesting by a developer, verification engineer or the like. The some aspects of the target computerized system 105 may be functionalities that are likely to involve an error.

In some exemplary embodiments, the test generator 120 may comprise a simulator 125. The simulator 125 may simulate a state of the target computerized system 105, as is known in the art. The test generator 120 may utilize the simulated state provided by the simulator 125 in generation of a test.

In some exemplary embodiments, the test generator 120 may further execute the test 130 on the target computerized system 105. The test generator 120 may execute the test 130 after completing generation of the test 130. In some exemplary embodiments, several tests are generated and may be executed on the target computerized system 105. In some exemplary embodiments, the test generator 120 may generate one or more tests, and an external execution module (not shown) may execute the one or more tests on the target computerized system 105.

Figure 2:
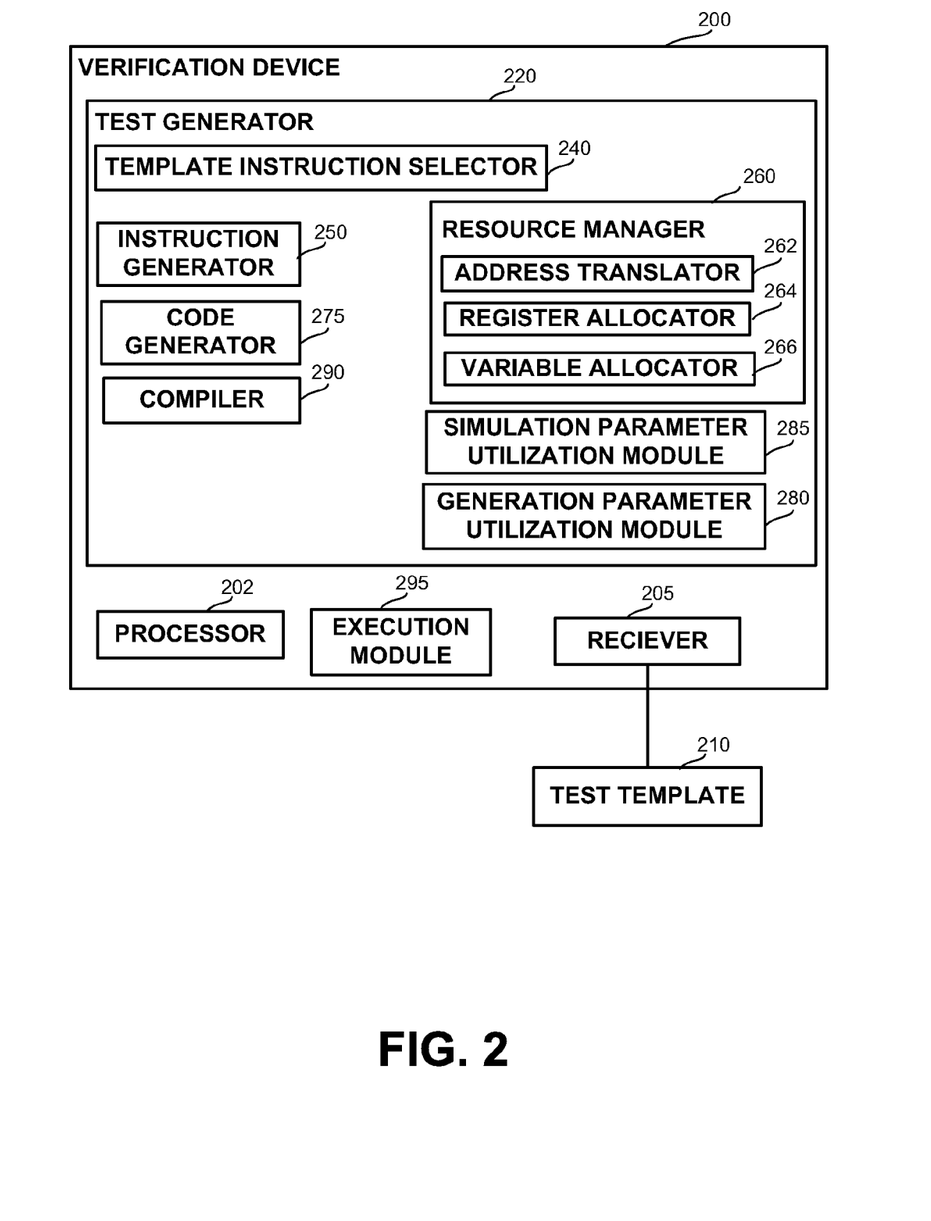
FIG. 2 shows a block diagram of a verification device, in accordance with some exemplary embodiments of the disclosed subject matter.

Referring now to FIG. 2 showing a block diagram of a verification device in accordance with some exemplary embodiments of the disclosed subject matter. A verification device 200 may comprise a test generator 220, such as 120 of FIG. 1.

The verification device 200 may further comprise a receiver 205. The receiver 205 may be configured to receive, retrieve or otherwise obtain a test template 210, such as 110 of FIG. 1. The receiver 205 may be an Application Programming Interface (API), a socket or otherwise utilize a I/O capable module to receive the test template 210. The received test template may comprise a plurality of template instructions comprising a source code template instruction. The source code template instruction may comprise at least one source code command.

In some exemplary embodiments, the verification device 200 comprises a processor 202. The processor 202 may be a Central Processing Unit (CPU), a microprocessor, an electronic circuit, an Integrated Circuit (IC) or the like. The processor 202 may be utilized to perform computations required by the verification device 200 or any of it subcomponents.

The test generator 220 may be configured to generate a test based on the test template 210.

In some exemplary embodiments, the test generator 220 may comprise a resource manager 260. The resource manager 260 may be configured to manage resources related to the test template 210. The resources may be related to resources utilized by instructions generated based on the test template. The resources may be utilized by instructions generated based on a template instruction that may or may not be a source code template instruction. In an exemplary embodiment, the resources are used by one or more source code commands comprised by a source code template instruction. In some exemplary embodiments, a sequence of source code commands comprised by a source code template instruction, comprises a first source code command and a second source code command. Both the first and the second source code commands may utilize the same resource. In some exemplary embodiments, an instruction generated based on a non-source code template instruction may utilize a resource that is also utilized by another instruction generated based on a source code template instruction, and vice versa. In some exemplary embodiments, the resource manager 260 may allocate a resource exclusively for a set of one or more template instructions.

In some exemplary embodiments, a resource managed by the resource manager 260 may be a memory element, such as a variable, a register and the like.

In some cases, the resource manager 260 may comprise a register allocator 264 configured to allocate registers to be utilized by the test template 210. In some exemplary embodiments, the register allocator 264 may be configured to retain initial values of registers used by the sequential code before execution of the sequential code, and restoration of the initial values after execution of the sequential code.

The resource manager 260 may comprise a variable allocator 266 for allocating memory space to be used for variables utilized by the sequential code defined in the test template 210.

The resource manager 260 may comprise an address translator 262. The address translator 262 may be configured to convert an address of a first type to an address of a second type. For example, the address translator 262 may translate a real address to an effective address. It will be noted that a target computerized system may be configured to utilize a addresses of the second type, whereas in some cases, the verification engineer may prefer to use addresses of the first type instead. The address translator 262 may enable an automatic translation of the address provided by the verification engineer to an address utilized by the target computerized system which has the same meaning. For example, it is common that a processor is configured to receive a command that uses an effective or virtual address. The processor may translate the effective or virtual address to a real or physical address. In some cases, the verification engineer may prefer to use real or physical address in lieu of an effective or virtual address. As one example of such situation, consider a case in which different component of the target computerized system utilize different addressing methods. In a situation, it may be easier for a verification engineer to define the template instruction using real address, and utilize the address translator 262 to translate the addresses for each component based on the addressing schema that component uses, such that all components may eventually access the same real address. The address translator 262 may be utilized in generation of an instruction based on a template instruction. The template instruction may or may not be a source code template instruction.

In some exemplary embodiments, the target computerized system may utilize a translation path to translate an address of a second type to an address of a first type. The address translator 262 may utilize the translation path to provide an inverse translation. In some exemplary embodiments, the address translator 262 may utilize another component configured to determine the translation path. In some exemplary embodiment, the address translator may be further configured to determine the translation path.

In some exemplary embodiments, the test generator 220 may comprise a template instruction selector 240. The template instruction selector 240 may be configured to select a template instruction from the test template 210. Selection of the template instruction may also comprise selection of a resource according to a command from the resource manager 260.

In some exemplary embodiments, the test generator 220 may comprise a code generator 275. The code generator 275 is configured to generate one or more instructions based on the source code template instruction. In some exemplary embodiments, the code generator 275 may utilize a compiler 290 to compile the source code commands of the source code template instruction. The compiled commands, which may comprise one or more instructions, may be inserted to the generated test. The compiled commands may be modified to utilize resources based on a determination by the resource manager 260. The code generator 275 may be configured to utilize said resource manager 260. For example, instructions generated by the code generator 275 utilizes registers or memory addresses allocated by the resource manager 260, or may utilize the resource manager 260 to translate an effective address to a real address.

In some exemplary embodiments, the test generator 220 may comprise an instruction generator 250. The instruction generator 250 may generate one or more instructions based on a template instruction. The instruction generator 250 may utilize the resource manager 260 in order to utilize a resource, such as memory address, register or the like. In one exemplary embodiment, the resource manager 260 may receive definitions or requirements related to the template instruction and allocate a resource accordingly. In some exemplary embodiments, the resource manager may allocate a list of resources such as registers or memory addresses that cannot be used by the template instruction, as said list of resources are uniquely allocated for utilization by the sequential code.

In some exemplary embodiments, the test generator 220 may comprise a generation parameter utilization module 280. The generation parameter utilization module 280 may be utilized to affect a generation of the source code template instruction. For example, a generation parameter may be passed during generation of the source code template instruction, and determine a manner in which the source code template instruction may be generated. In some exemplary embodiments, the generation parameter may be passed from an external module, from the test generator 220, based on previously generated instructions, from a user, or the like. The generation parameter may be, for example, a bit size of an element, such as for example a packet, an address of an element, such as for example a queue, or the like.

In some exemplary embodiments, the test generator 220 may comprise a simulation parameter utilization module 285. The simulation parameter utilization module 285 may be utilized to pass a parameter to the generated instructions associated with the source code of the source code template instruction. The parameters may be utilized during execution of the test, also referred to as simulation. The simulation parameter may comprise any data utilized by the test. For example, in a communication protocol, wherein the source code template instruction is utilized to prepare a packet to be sent, a simulation parameter may be a content of the packet. It will be noted that the content may be determined by other instructions that may or may not be generated based on non-source code template instructions.

In some exemplary embodiments, the test generator 220 may comprise a compiler 290. The compiler 290 may be utilized to compile the source code command into an at least one test instruction. In some cases, there is no available compiler that may compile the source code in accordance with the target computerized device. For example, in case the target computerized device is a new processor being developed. In some exemplary embodiments, the new processor may be a next generation of a design, and may be backward-compatible with previous designs. The disclosed subject matter may utilize a previous generation compiler as the compiler 290 before a compiler of the new processor becomes available. The compiler 290 may be used to convert a high-level program code, such as C, C++, JAVA and the like, into a machine language, such as assembly language, binary or the like.

In some exemplary embodiments, the verification device 200 may comprise an execution module 295. The execution module 295 may be utilized to execute the test on the target computerized system. The execution module 295 may be configured to execute the test once generation of the test by the test generator 220 is completed.

Figure 3:
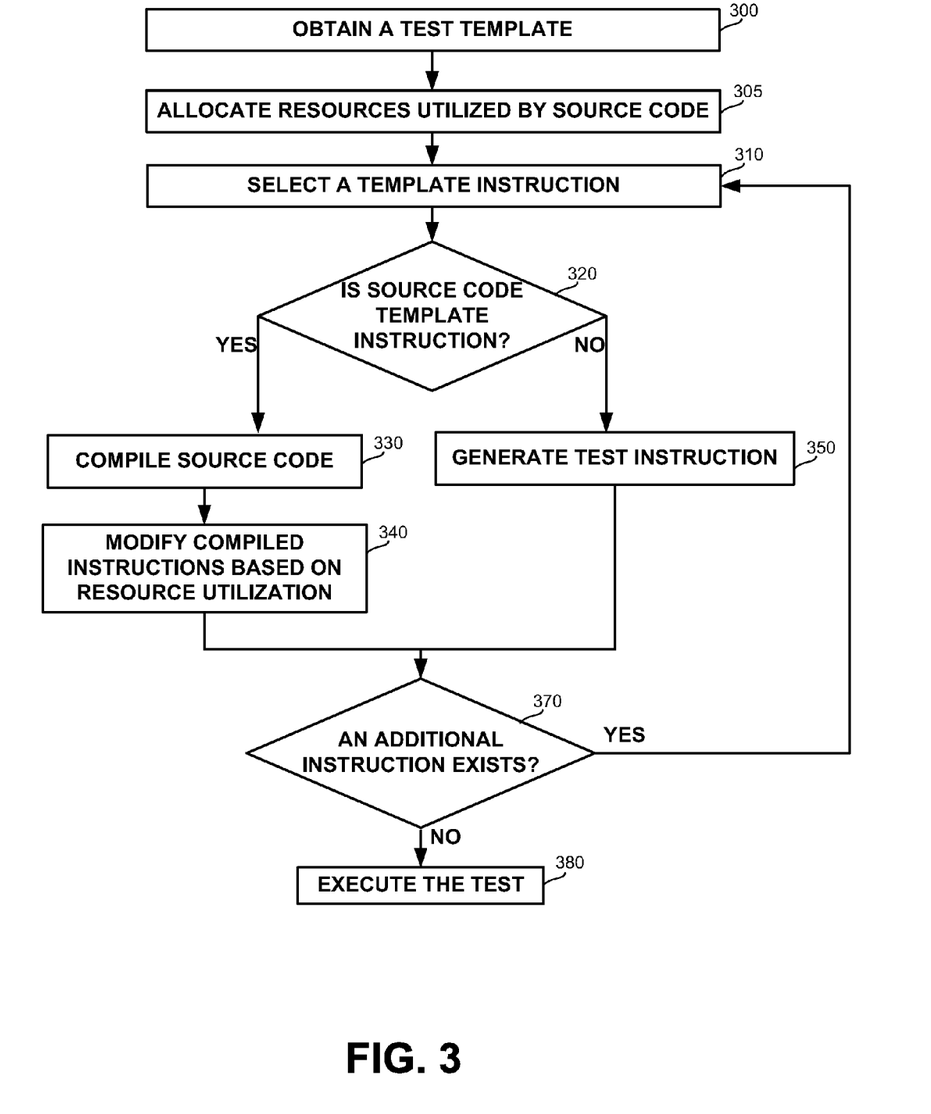
FIG. 3 shows a flowchart diagram of a method, in accordance with some exemplary embodiments of the disclosed subject matter.

Referring now to FIG. 3 showing a flowchart diagram of a method in accordance with some exemplary embodiments of the disclosed subject matter.

In step 300, a test template, such as 210 of FIG. 2, may be obtained. The test template may be obtained by a receiver, such as 205 of FIG. 2. In some exemplary embodiments, the obtained test template refers to two or more predefined template instructions, as at least one template instruction of the two or more predefined template instructions require data utilized or processed by another template instruction of the two or more predefined template instructions.

In step 305, resources utilized by source code of a source code template instruction may be allocated. The allocation may be performed by a resource manager 260 of FIG. 2. The resources may be allocated for variables utilized by the source code, for registers utilized by instructions representing the source code, or the like.

In step 310, a template instruction from the test template may be selected. The template instruction may be selected by a template instruction selector, such as 240 of FIG. 2. The selected template instruction may be utilized by to generate one or more test instruction.

In step 320, a determination may be made based on the type of template instruction selected in step 310. In case the template instruction is a source code template instruction steps 330 and 340 may be performed. Otherwise, step 350 may be performed.

In step 330, source code associated with the source code template instruction may be compiled. The source code may be compiled by a compiler such as 290 of FIG. 2. In some exemplary embodiments, compilation may not be required, as the source code may be provided in a target language of the test. In some exemplary embodiments, the instructions in the test may be generated based on the compiled source code, based on generation parameters, such as handled by generation parameters utilization module 280.

In some exemplary embodiments, allocation of resources, such as described in respect to step 305, may be performed in response to a selection of a source code template instruction. For example, step 305 may be comprised in step 330.

In step 340, the compiled instructions of step 330 may be modified to utilize resources. The compiled instructions may be modified by a resource manager, such as 260 of FIG. 2. In some exemplary embodiments, the resource manager may alter the source code before compiling in lieu of modifying the compiled instructions. Modifications of the compiled instructions may comprise adding additional instructions, such as for storing values of registers before execution of the compiled instructions and restoring the values of the registers in response to execution of the compiled instructions. In some cases, the resource manager may manipulate addresses utilized by the compiled instructions, such as by translating effective addresses to real address.

In step 350, a template instruction may be utilized to generate one or more test instructions, in accordance with the template instruction. The generation may utilize biased generator, random generator, Constraint Satisfaction Problem solver-based generator or another instruction generator, such as 250 of FIG. 2.

In step 370, in case all template instructions were selected and pertinent portions of the test were generated, step 380 may be performed. Otherwise, another iteration may be performed starting from step 310, in which a different template instruction may be selected.

In step 380, the test, which was generated by the disclosed method, may be executed. The test may be executed by an execution module, such as 295 of FIG. 2. The test may be executed by a verification engineer.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as JAVA, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus having a processor, the apparatus comprising:
   a receiver configured to receive a test template, wherein the test template comprises a plurality of template instructions, wherein the plurality of template instructions comprise a source code template instruction, wherein the source code template instruction defines a source code command to be generated;
   a test generator configured to generate a test in accordance with the test template received by said receiver, said test generator comprising:
      an instruction generator configured to generate a first instruction based on a template instruction of the plurality of template instructions; and
      a code generator configured to generate a second instruction based on the source code template instruction, wherein the second instruction is associated with the source code command,
   wherein said test generator is configured to manage shared resources used by the generated first instruction and the generated second instruction, and
   wherein said instruction generator and said code generator are configured to utilize a resource manager for allocating shared resources to be used by the generated first instruction and the generated second instruction.

2. The apparatus according to claim 1, wherein said code generator utilizes a compiler, wherein the compiler is configured to compile the source code command.

3. The apparatus according to claim 2, wherein said test generator comprises the compiler.

4. The apparatus according to claim 1, wherein the source code command is a machine language command.

5. The apparatus according to claim 1, wherein the source code command is a high-level programming language command.

6. The apparatus according to claim 1, wherein said resource manager utilizes an address translator configured to translate an address of a first type to an address of a second type.

7. The apparatus according to claim 1, wherein said resource manager comprises a register allocation module.

8. The apparatus according to claim 1, wherein said resource manager comprises a variable allocation module.

9. The apparatus according to claim 1, wherein said code generator comprises a generation parameter utilization module.

10. The apparatus according to claim 1, wherein said code generator comprises a simulation parameter utilization module.

11. The apparatus of claim 1,
wherein each of the plurality of template instructions is configured to provide for an interaction between hardware components of a target computerized system; and
wherein each of the plurality of template instructions is addressed to trigger functionality of one of the hardware components.

12. A method for generating a test based on a test template, the method comprising:
receiving the test template, wherein the test template comprises a plurality of template instructions, wherein the plurality of template instructions comprise a source code template instruction, wherein the source code template instruction defines a source code command to be generated;
generating the test based on the test template, said generating the test based on the test template comprises:
generating a first instruction based on a first template instruction of the plurality of template instructions;
generating a second instruction based on the source code template instruction, wherein the second instruction is associated with the source code command; and
wherein said generating the first instruction and said generating the second instruction comprise:
managing shared resources used by the generated first instruction and the generated second instruction, and
utilizing a resource manager for allocating shared resources to be used by the generated first instruction and the generated second instruction;
whereby the test template is transformed to the test.

13. The method of claim 12, wherein said generating the second instruction comprises compiling the source code command of the source code template instruction.

14. The method of claim 12, wherein said managing shared resources comprises allocating memory for variables defined in source code.

15. The method of claim 12, wherein said managing shared resources comprises generating instructions configured to restore a value of a memory element utilized by the generated second instruction.

16. The method of claim 15, wherein the memory element is a register.

17. The method of claim 12, wherein said managing shared resources comprises translating an address of a first type to an address of a second type.

18. The method of claim 12, wherein said generating the second instruction comprises obtaining values of generation parameters, and utilizing the values of the generation parameters in said generating the second instruction.

19. The method of claim 12,
wherein each of the plurality of template instructions is configured to provide for an interaction between hardware components of a target computerized system; and
wherein each of the plurality of template instructions is addressed to trigger functionality of one of the hardware components.

20. A computer program product for generating a test based on a test template comprising:
a non-transitory computer readable medium;
a first program instruction for receiving the test template, wherein the test template comprises a plurality of template instructions, wherein the plurality of template instructions comprise a source code template instruction, wherein the source code template instruction defines a source code command to be generated;
a second program instruction for generating the test based on the test template, said second program instruction comprises:
a third program instruction for generating a first instruction based on a first template instruction of the plurality of template instructions; and
a fourth program instruction for generating a second instruction based on the source code template instruction, wherein the second instruction is associated with the source code command,
wherein said third and fourth program instructions comprise a fifth program instruction for managing shared resources used by the generated first instruction and the generated second instruction, and allocating shared resources to be used by the generated first instruction and the generated second instruction, and
wherein said first, second, third, fourth and fifth program instructions are stored on said non-transitory computer readable medium.

21. The computer program product of claim 20, wherein said fifth program instruction is operative to translate an address of a first type to an address of a second type.

* * * * *